(12) United States Patent
Nakano et al.

(10) Patent No.: US 7,501,138 B2
(45) Date of Patent: Mar. 10, 2009

(54) LIQUID FOOD/DRINK CONTAINING FAT-SOLUBLE VITAMIN AND METHOD OF STABILIZING FAT-SOLUBLE VITAMIN

(75) Inventors: Yuichiro Nakano, Inashiki-gun (JP); Takahiro Hara, Ryugasaki (JP)

(73) Assignee: Kyowa Hakko Food Specialities Co., Ltd., Tokyo (JP)

( * ) Notice: Subject to any disclaimer, the term of this patent is extended or adjusted under 35 U.S.C. 154(b) by 451 days.

(21) Appl. No.: 10/510,772

(22) PCT Filed: Apr. 10, 2003

(86) PCT No.: PCT/JP03/04564

§ 371 (c)(1),
(2), (4) Date: Oct. 12, 2004

(87) PCT Pub. No.: WO03/084352

PCT Pub. Date: Oct. 16, 2003

(65) Prior Publication Data

US 2005/0158424 A1    Jul. 21, 2005

(30) Foreign Application Priority Data

Apr. 11, 2002   (JP) ............................. 2002-108787

(51) Int. Cl.
*A23L 1/302*    (2006.01)
(52) U.S. Cl. ............................ 426/72; 426/73; 426/262; 426/268; 426/540; 426/541; 426/590
(58) Field of Classification Search ................ 426/72, 426/73, 590, 262, 268, 540, 541
See application file for complete search history.

(56) References Cited

U.S. PATENT DOCUMENTS

| 5,607,707 | A | 3/1997 | Ford et al. |
| 5,780,086 | A | 7/1998 | Kirksey et al. |
| 6,048,566 | A | 4/2000 | Behnam et al. |
| 6,132,790 | A | 10/2000 | Schlipalius |
| 6,194,009 | B1 * | 2/2001 | Kamarel ................. 426/72 |
| 6,264,986 | B1 | 7/2001 | Hahnlein et al. |
| 6,531,157 | B1 | 3/2003 | Hahnlein et al. |
| 7,279,180 | B2 | 10/2007 | Hahnlein et al. |
| 2003/0125310 | A1 | 7/2003 | Hahnlein et al. |

FOREIGN PATENT DOCUMENTS

| JP | 04-026670 | 1/1992 |
| JP | 07-067574 | 3/1995 |
| JP | 07-241181 | 9/1995 |
| JP | 11-056232 | 3/1999 |
| JP | 11-127816 | 5/1999 |
| JP | 2000-7583 | 1/2000 |

OTHER PUBLICATIONS

Teraoka, et al., "Improvement of the Photostability of Phytonadione (Vitamin $K_1$) in Model Infusion Fluids: Effect of Addition of Fat-soluble Vitamin on the Photodegradation of Phytonadione", Jpn. J. Hosp. Pharm., vol. 22, No. 5, pp. 449-456, 1996.
Teraoka, et al., "Evaluation of carotenoid as photostabilizer, Effect on photostability of menatetrenone" Abstracts of the 110th Annual Meeting of the Pharmaceutical Society of Japan, vol. 4, p. 104, 1990.
"Photodegradation of vitamins in transfusion—Effect of light-resistant cover and non-ultraviolet fluorescent lamp-", Jpn. J. Hosp. Pharm., vol. 28, No. 2, pp. 47-49, 1992 (including English translation).
Asker, et al., "Photostabilization of Menadione Sodium Bisulfite by Glutathione", J. Parenteral Science & Technology, vol. 43, No. 5, pp. 204-207, 1989.
English translation of the IPER dated Jun. 5, 2004, for No. PCT/JP03/04564.

* cited by examiner

*Primary Examiner*—Helen F Pratt
(74) *Attorney, Agent, or Firm*—Antonelli, Terry, Stout & Kraus, LLP.

(57) ABSTRACT

The present invention relates to a liquid food or drink containing a lipid-soluble vitamin, which comprises a pigment selected from the group consisting of riboflavin or a derivative thereof or a salt of the same, a carotenoid pigment, a cochineal extract pigment and a safflower pigment, or an emulsion, and an antioxidant; a method of stabilizing a lipid-soluble vitamin, which comprises adding the aforementioned pigment or emulsion and the antioxidant to a solution or a liquid food or drink containing a lipid-soluble vitamin; and a composition consisting of the aforementioned pigment or emulsion, and the antioxidant.

6 Claims, No Drawings

LIQUID FOOD/DRINK CONTAINING FAT-SOLUBLE VITAMIN AND METHOD OF STABILIZING FAT-SOLUBLE VITAMIN

TECHNICAL FIELD

The present invention relates to a liquid food or drink containing a lipid-soluble vitamin and a method of stabilizing a lipid-soluble vitamin, and a composition used in the method.

BACKGROUND ART

Among lipid-soluble vitamins, many of them are unstable to light, heat or oxidation. Thus, stabilizing a lipid-soluble vitamin in a liquid food or drink containing the lipid-soluble vitamin has been a problem.

Known methods of stabilizing lipid-soluble vitamins include a method of stabilizing vitamin K through adding a light-sensitive lipid-soluble substance [Jpn. J. Hosp. Pharm., 22, 449 (1996), Abstracts of the 110th Annual Meeting of the Pharmaceutical Society of Japan, 4, 104 (1990)], a method of stabilizing with a light shielding cover [Jpn. J. Hosp. Pharm., 28, 47 (1992)], a method of suppressing light-induced decomposition of vitamin $K_2$ in a solution by adding glutathione [(J. Parenteral Science & Technology, 43, 204(1989)], a method of stabilizing a lipid-soluble vitamin by uniformly mixing carotenoid with the lipid-soluble vitamin (Japanese Published Unexamined Patent Application No. 26670/92), a method of stabilizing a lipid-soluble drug which is unstable to light by blending at least one substance selected from yellow and red coloring agents (Japanese Published Unexamined Patent Application No. 7583/00) and the like.

However, there have been no reports made to date regarding effects of using a pigment or an emulsion in combination with an antioxidant to stabilize a lipid-soluble vitamin, particularly, vitamin K or ubiquinone.

Known food or drink containing a lipid-soluble vitamin include a food or drink containing vitamin K (Japanese Published Unexamined Patent Application No. 127816/99), milk and a dairy product with enriched vitamin K and calcium (Japanese Published Unexamined Patent Application No. 56232/99), a nonalcoholic beverage containing ubiquinone (Japanese Translation of PCT International Application No. 504343/01), a beverage composition containing vitamin A or vitamin E (WO96/04801) and the like.

DISCLOSURE OF THE INVENTION

An object of the present invention is to provide a liquid food or drink containing a lipid-soluble vitamin, a method of stabilizing a lipid-soluble vitamin, and a composition used in the method.

The present invention relates to the following (1) to (20).

(1) A liquid food or drink containing a lipid-soluble vitamin, which comprises a pigment selected from the group consisting of riboflavin or a derivative thereof or a salt of the same, a carotenoid pigment, a cochineal extract pigment and a safflower pigment, or an emulsion, and an antioxidant.

(2) The liquid food or drink according to the above (1), wherein the antioxidant is an antioxidant selected from the group consisting of polyphenol, tocopherol or a derivative thereof or a salt of the same, ascorbic acid or a salt thereof, rutin, caffeine and isoflavone.

(3) The liquid food or drink according to the above (1) or (2), wherein the lipid-soluble vitamin is vitamin K or ubiquinone.

(4) The liquid food or drink according to the above (3), wherein the vitamin K is phylloquinone (vitamin $K_1$), menaquinone (vitamin $K_2$) or menadione (vitamin $K_3$).

(5) The liquid food or drink according to the above (3), wherein the ubiquinone is ubidecarenone.

(6) The liquid food or drink according to any one of the above (1) to (5), wherein the carotenoid pigment is a carotenoid pigment selected from the group consisting of carotene, a gardenia pigment, a marigold pigment and lycopene.

(7) The liquid food or drink according to any one of the above (1) to (6), wherein the content of the pigment is equal to or more than 0.1 mg per 100 ml of the liquid food or drink.

(8) The liquid food or drink according to any one of the above (1) to (6), wherein the content of the emulsion is equal to or more than 1 g per 100 ml of the liquid food or drink.

(9) The liquid food or drink according to any one of the above (1) to (6), wherein the content of the antioxidant is equal to or more than 0.1 mg per 100 ml of the liquid food or drink.

(10) A method of stabilizing a lipid-soluble vitamin, which comprises adding a pigment selected from the group consisting of riboflavin or a derivative thereof or a salt of the same, a carotenoid pigment, a cochineal extract pigment and a safflower pigment, or an emulsion, and an antioxidant to a solution or a liquid food or drink containing the lipid-soluble vitamin.

(11) The method of stabilizing a lipid-soluble vitamin according to the above (10), wherein the antioxidant is an antioxidant selected from the group consisting of polyphenol, tocopherol or a derivative thereof or a salt of the same, ascorbic acid or a salt thereof, rutin, caffeine and isoflavone.

(12) The stabilizing method according to the above (10) or (11), wherein the lipid-soluble vitamin is vitamin K or ubiquinone.

(13) The stabilizing method according to the above (12), wherein the vitamin K is phylloquinone (vitamin $K_1$), menaquinone (vitamin $K_2$) or menadione (vitamin $K_3$).

(14) The stabilizing method according to the above (12), wherein the ubiquinone is ubidecarenone.

(15) The stabilizing method according to any one of the above (10) to (14), wherein the carotenoid pigment is a carotenoid pigment selected from the group consisting of carotene, a gardenia pigment, a marigold pigment and lycopene.

(16) The stabilizing method according to any one of the above (10) to (15), wherein the pigment is added to give the content of the pigment per 100 ml of the solution or the liquid food or drink containing the lipid-soluble vitamin to be equal to or more than 0.1 mg.

(17) The stabilizing method according to any one of the above (10) to (15), wherein the emulsion is added to give the content of the emulsion per 100 ml of the solution or the liquid food or drink containing the lipid-soluble vitamin to be equal to or more than 1 g.

(18) The stabilizing method according to any one of the above (10) to (15), wherein the antioxidant is added to give the content of the antioxidant per 100 ml of the solution or the liquid food or drink containing the lipid-soluble vitamin to be equal to or more than 0.1 mg.

(19) A composition consisting of a pigment selected from the group consisting of riboflavin or a derivative thereof or a salt of the same, a carotenoid pigment, a cochineal extract pigment and a safflower pigment, or an emulsion, and an antioxidant selected from the group consisting of polyphenol, tocopherol or a derivative thereof or a salt of the same, ascorbic acid or a salt thereof, rutin, caffeine and isoflavone.

(20) The composition according to the above (19), wherein the carotenoid pigment is a carotenoid pigment selected from the group consisting of carotene, a gardenia pigment, a marigold pigment and lycopene.

Examples of the lipid-soluble vitamin used in the present invention include vitamin K, vitamin D, vitamin A, ubiquinone and the like.

The lipid-soluble vitamin which may be used includes any of the lipid-soluble vitamin which is extracted and purified from a natural source by a known method; which is obtained through chemical synthesis by a known method; and which is obtained by a fermentation method in which a microorganism or the like is used. Alternatively, commercially available one may also be used.

Examples of vitamin K include phylloquinone (vitamin $K_1$), menaquinone (vitamin $K_2$), menadione (vitamin $K_3$) and the like.

Examples of menaquinone include menaquinone-4, menaquinone-5, menaquinone-6, menaquinone-7, menaquinone-8, menaquinone-9 and the like, and, menaquinone-4 and menaquinone-7 are preferably used.

Examples of vitamin D include ergocalciferol (vitamin $D_2$), cholecalciferol (vitamin $D_3$), derivatives thereof such as sulfate esters, and the like.

Examples of vitamin E include α-tocopherol, β-tocopherol, γ-tocopherol, δ-tocopherol, α-tocotrienol, β-tocotrienol, γ-tocotrienol, δ-tocotrienol, derivatives thereof such as acetate esters, nicotinate esters, phosphate esters, and the like. In addition, salts thereof may be included. For example, α-tocopherol disodium salt is included.

Examples of vitamin A include retinol (vitamin $A_1$), 3-dehydroretinol (vitamin $A_2$), retinal, 3-dehydroretinal, retinoic acid, 3-dehydroretinoic acid, derivatives thereof such as acetate esters, palmitate esters, and the like.

As the ubiquinone, ubiquinone having 1 to 12 isoprene residues is preferably used; the ubiquinone having 6 to 12 isoprene residues is more preferably used; and the ubiquinone having 10 isoprene residues (hereinafter, referred to as ubidecarenone) is particularly preferably used.

Examples of the pigment which may be used in the present invention include riboflavin or derivatives thereof or salts of the same, carotenoid pigments, cochineal extract pigments, safflower pigments, and the like.

The aforementioned pigment may be used alone, or two or more pigments may be used in combination.

Examples of the derivative of riboflavin include riboflavin phosphate ester, riboflavin butyrate ester and the like. Examples of salts of riboflavin or a derivative thereof include sodium salts, potassium salts and the like. Specifically, sodium riboflavin 5'-phosphate ester can be exemplified.

Examples of the carotenoid pigment include carotene, gardenia pigments, marigold pigment, lycopene and the like.

Examples of carotene include α-carotene, β-carotene, γ-carotene and the like, and, β-carotene is preferably used.

The pigment which can be used in the present invention may be commercially available pigment, and, it may be any material containing the pigment, or an extract obtained by extracting from such a material containing the pigment with a solvent or the like, or may be a concentrate or a dried matter of such an extract, as well as a purified product obtained by purifying such an extract according to a conventional method.

Examples of the material containing riboflavin or a derivative thereof or a salt of the same include *Saccharomyces cerevisiae* as an example of the material containing a sodium riboflavin 5'-phosphate ester.

Among the carotenoid pigments, examples of the material containing β-carotene include green and yellow vegetables such as carrot and pumpkin, microalgaes such as *Dunaliella salina*, and the like. Examples of the material containing the gardenia pigment include rubiaceous gardenia (*Gardenia jasminoides* Ellis) and the like. Examples of the material containing the marigold pigment include flowers of asteraceae marigold (*Tagetes erecta* WILLD.) and the like. Examples of the material containing lycopene include solanaceae tomato (*Lycopersicon esculentum* MILL.) and the like.

Examples of the material containing the cochineal extract pigment include coccidae cochineal (*Coccus cacti* L.) and the like.

Examples of the material containing the safflower pigment include asteraceae safflower (*Carthamus tinctorius* L.) and the like.

The solvent used for the solvent extraction of the pigment may be any solvent, for example, an aqueous medium, an organic solvent or the like as long as it can extract the above pigments. Further, the solvent may be used alone, or as a mixed solvent including a combination of multiple solvents.

Examples of the aqueous medium include water, purified water, deionized water, distilled water and the like.

As the organic solvent, alkyl acetate, monoaliphatic alcohol and aliphatic ketone are preferably used. Ethyl acetate, ethanol and acetone are more preferred, and in light of the utilization for a food or drink, ethanol is particularly preferred.

The extraction may be carried out using a stirrer, a sonicator, a reflux extractor, a Soxhlet extractor or the like. Following the extraction, the resulting extracted fluid may be employed as an extract, or the extracted residue may be further extracted with an extraction solvent to give the resulting extracted fluid as the extract.

Concentration or drying of the extracted fluid can be carried out by a conventional method such as heat concentration, vacuum concentration, lyophilization, air drying and forced-air drying. Products obtained by these treatments may be used as a concentrate or dried matter of the extract.

Purification from the extract may be carried out by a conventional method such as a membrane separation method, as well as a liquid membrane separation method, a solvent partition method, or a fractionation method such as partition chromatography, adsorption chromatography, ion chromatography, affinity chromatography, gel chromatography, dialysis, and the like.

The emulsion used in the present invention may be any emulsion which is derived from a natural source or produced artificially so long as it can be used for a food or drink, and imparts turbidity to a liquid food or drink.

Examples of the emulsion derived from a natural source include milk of a mammal such as cow milk, goat milk, ewe milk and horse milk, skimmed milk, partially skimmed milk, fermented milk, lactic acid bacterial beverage, milk beverage, concentrated milk, skimmed and concentrated milk, and the like.

Examples of artificially produced emulsion include emulsions obtained by emulsification according to a conventional method by mixing an aqueous medium, a fat and oil (essential oil, vegetable oil, animal oil such as butter oil, or the like), and an emulsifier (glycerin fatty acid ester, sucrose fatty acid ester, lecithin, saponin, milk protein, gum arabic or the like) using a high speed stirring emulsifier, a sonicator, a high-pressure homogenizer, an ultra high-pressure homogenizer or the like. As the milk protein, casein or casein sodium is preferably used.

Examples of the aqueous medium used in the preparation of the emulsion include e.g., water, purified water, deionized water, distilled water and the like.

As the fat and oil, a vegetable oil is preferably used.

As the emulsifier, gum arabic or a sucrose fatty acid ester is preferably used.

Although the emulsion may be oil in water (OW) type or water in oil (W/O) type, an oil in water type is preferred.

Examples of the emulsion include emulsions obtained by adding gum arabic and a sucrose fatty acid ester as the emulsifier to a mixture of water and a vegetable oil followed by emulsification process. The vegetable oil to water is preferably 0.5 to 50%, and more preferably 0.5 to 20% in a volume ratio.

The emulsifier is preferably 10 to 40% to water in volume ratio.

Specific examples of the emulsion include Cloudy base (manufactured by Ogawa & Co., Ltd.), Neocla B-2 (manufactured by San-Ei Gen F.F.I., Inc.), Neocla B19 (manufactured by San-Ei Gen F.F.I., Inc.), Neocla No 30380 (manufactured by San-Ei Gen F.F.I., Inc.) and the like.

Examples of the antioxidant used in the present invention include polyphenol, tocopherol or derivatives thereof or salts of the same, ascorbic acid or salts thereof, rutin, caffeine, isoflavone and the like.

These antioxidants may be used alone, or two or more may be used in combination.

Examples of polyphenol include catechin, proanthocyanidin and the like.

Examples of tocopherol include α-tocopherol, β-tocopherol, γ-tocopherol, δ-tocopherol, α-tocotrienol, β-tocotrienol, γ-tocotrienol, δ-tocotrienol and the like. Examples of these derivatives include acetate esters, nicotinate esters, phosphate esters and the like. An example of these salts includes α-tocopherol disodium.

Salts of ascorbic acid include a sodium salt, a potassium salt or the like.

The antioxidant used in the present invention may be an extract obtained by extracting from a material containing such an antioxidant with a solvent or the like, or may be a concentrate or dried matter of such an extract, as well as a purified product obtained by purifying such an extract according to a conventional method.

The extraction can be carried out according to the method described in the aforementioned extraction of the pigment.

Examples of the material containing the antioxidant include, as those containing polyphenol, coffee beans, grape seeds, immature apples, leaves or flowers of labiatae Rosemary (*Rosmarinus officinalis*), leaves of theaceae tea (*Camellia sinensis*) and the like. Examples of the material containing caffeine include coffee beans, leaves of theaceae tea (*Camellia sinensis*) and the like. Examples of the material containing isoflavone include e.g., soybean and the like.

A lipid-soluble vitamin can be stabilized by adding a pigment or an emulsion and an antioxidant to a solution or a liquid food or drink containing the lipid-soluble vitamin. The pigment or the emulsion and the antioxidant used may include the same compound as the lipid-soluble vitamin to be stabilized, however, such a vitamin is not usually included.

Examples of the solution containing the lipid-soluble vitamin include solutions obtained by adding the lipid-soluble vitamin to an aqueous medium such as water, purified water, deionized water or distilled water, or an organic solvent such as ethanol.

The lipid-soluble vitamin may be used alone, or two or more may be used in combination.

When the lipid-soluble vitamin is added to an aqueous medium, it is preferred that an emulsified fluid containing the lipid-soluble vitamin obtained by mixing the lipid-soluble vitamin with water, glycerol, or propylene glycol, and an emulsifier (sorbitan, gumarabic, a fatty acid ester of sucrose, lecithin or the like) followed by emulsification with a conventional method using a high speed stirrer, a sonicator, a high-pressure homogenizer, an ultra high-pressure homogenizer or the like, or that a commercially available formulation of an emulsified lipid-soluble vitamin is used, because the lipid-soluble vitamin is insoluble in water.

Furthermore, a solution obtained by adding a lipid-soluble vitamin to an aqueous medium or an organic solvent, thereafter adding the aforementioned emulsifier followed by emulsification in similar manner as above may be used as a solution containing a lipid-soluble vitamin.

Examples of the liquid food or drink containing the lipid-soluble vitamin include any one in the form of a liquid, fruit juice drinks or fruit drinks with pulps such as orange juice, soft drinks such as cola, milk beverages such as milk, lactic acid bacterial beverages, soybean milk beverages, Japanese tea beverages, tea beverages, coffee beverages, alcohol beverages such as wine, nutrition supplement drinks, vegetable juice such as tomato juice, soup for the noodle, Chinese noodle soup, liquid dressing, soup, miso soup and the like, but not limited thereto as long, as it is drinkable.

The liquid food or drink containing the lipid-soluble vitamin can be produced by using a general process for producing a liquid food or drink except that the lipid-soluble vitamin is added.

The lipid-soluble vitamin may be used alone, or two or more may be used in combination.

If a liquid food or drink contains a lipid-soluble vitamin in advance, the lipid-soluble vitamin may not necessarily be added.

A solution or a liquid food or drink which is obtained by adding a pigment or an emulsion and an antioxidant to a solution or a liquid food or drink containing a lipid-soluble vitamin can be used as the liquid food or drink of the present invention. The liquid food or drink of the present invention can be suitably used as a health food containing a lipid-soluble vitamin.

It is preferred that a lipid-soluble vitamin is included at a high concentration in the liquid food or drink of the present invention, particularly, when the liquid food or drink of the present invention is used as a health food.

For example, in case of vitamin K, the content of the lipid-soluble vitamin in 100 ml of the liquid food or drink of the present invention is preferably equal to or more than 8 μg, more preferably equal to or more than 10 μg, and still more preferably equal to or more than 50 μg. Similarly, in case of vitamin D, it is preferably equal to or more than 0.1 μg, and more preferably equal to or more than 0.5 μg. In case of vitamin E, it is preferably equal to or more than 1 mg, and more preferably equal to or more than 5 mg. In case of vitamin A, it is preferably equal to or more than 0.1 mg, and more preferably equal to or more than 0.5 mg. In case of ubiquinone, it is preferably equal to or more than 1 mg, more preferably equal to or more than 10 mg, and still more preferably equal to or more than 30 mg.

According to the present invention, stability of the lipid-soluble vitamin can be determined by for example, measuring the concentration of the lipid-soluble vitamin after irradiating a light of 2000 lux to 20 ml of the liquid food or drink of the present invention with a cool white fluorescent lamp, thereby determining the percentage of the concentration of the lipid-soluble vitamin post irradiation of light to the concentration before irradiating the light (hereinafter, referred to as residual ratio).

The amount of the pigment to be added to 100 ml of the liquid food or drink of the present invention is preferably the amount which make the pigment contained in the liquid food or drink of the present invention to be equal to or more than 0.1 mg, more preferably to be equal to or more than 0.5 mg, and still more preferably to be equal to or more than 1 mg.

The amount of the emulsion to be added to 100 ml of the liquid food or drink of the present invention is preferably the amount which make the emulsion contained in the liquid food or drink of the present invention to be equal to or more than 1 g, and more preferably to be equal to or more than 5 g.

The amount of the antioxidant to be added to 100 ml of the liquid food or drink of the present invention is preferably the amount which make the antioxidant contained in the liquid food or drink of the present invention to be equal to or more than 0.1 mg, more preferably to be equal to or more than 0.5 mg, and still more preferably to be equal to or more than 1 mg.

Any food additive generally used in a food or drink, for example, edulcorants, coloring materials, preservatives, thickening stabilizer, antioxidants, color couplers, bleaching materials, fungicides, gum bases, bitters, enzymes, wax, acidulants, seasonings, emulsifiers, fortifying agents, agents for preparation, flavors, spice extracts and the like, in addition to the lipid-soluble vitamin, pigment, emulsion, and the antioxidant, may be added to the liquid food or drink of the present invention.

A composition obtained by mixing the aforementioned pigment or emulsion and antioxidant can be used as a stabilizer of a lipid-soluble vitamin.

The composition may be used as its powder form, or may be used as a solution prepared by dissolving it in an aqueous medium, an organic solvent or the like, which is similar to an aqueous medium or an organic solvent in which a lipid-soluble vitamin is can be dissolved.

Further, the composition may be used with addition of various types of additives which can be used in a food or drink, such as seasonings, spices, inorganic salts, acids, amino acids, nucleic acids and saccharides, as needed.

Examples of the inorganic salt include sodium chloride, potassium chloride, ammonium chloride, magnesium oxide, dolomite and the like. Examples of the acids include carboxylic acids such as fumaric acid, malic acid, tartaric acid, citric acid and fatty acid, and salts thereof, and the like. Examples of the salts include sodium and potassium salts. Examples of the amino acids include sodium glutamate, glycine and the like. Examples of the nucleic acid include sodium inosinate, sodium guanylate and the like. Examples of the saccharides include sucrose, glucose, lactose and the like. Examples of the seasonings include soy sauce, fermented soybean paste, natural seasonings such as extracts. Examples of the spices include various types of spices. Although the amount of these substances to be added can be determined ad libitum depending on the intended use, it is preferably 0.1 to 500 parts by weight per 100 parts by weight of the aforementioned composition comprising the pigment or the emulsion and the antioxidant.

Examples of the present invention are described herein below.

BEST MODE FOR CARRYING OUT THE INVENTION

Example 1

In 1 L of water was dissolved 2000 mg of vitamin $K_2$ emulsified powder (manufactured by Kyowa Hakko Kogyo Co., Ltd.; containing 0.2% menaquinone-4) to produce an aqueous solution containing vitamin $K_2$ at a concentration of 4 mg/L.

To the aqueous solution was added an agent or a preparation containing the pigment or the antioxidant shown in Tables 1 to 9 to give the content of the pigment and the antioxidant to be the amount as shown in Tables 1 to 9, respectively, followed by mixing with stirring to prepare an aqueous solution containing vitamin $K_2$. Each pigment was added in an amount such that transmittance with the optical path length of 1 cm became 12% when the pigment was dissolved in the aqueous solution containing vitamin $K_2$ and thereto was irradiated the light having a wavelength of 430 nm.

The agents or preparations containing the pigment or the antioxidant shown in Tables 1 to 9 are described below.

Pigment:

Riboflavin 5'-phosphate ester sodium (manufactured by Nippon Roche K.K.) was used as riboflavin; water-soluble biocarotene (manufactured by Kyowa Hakko Kogyo Co., Ltd.; containing 2% β-carotene) was used as β-carotene; San yellow 3L (manufactured by San-Ei Gen F.F.I., Inc.; containing 40% gardenia yellow pigment) was used as a gardenia pigment; marigold base (manufactured by San-Ei Gen F.F.I., Inc.; containing 2% marigold pigment) was used as a marigold pigment; tomato pigment (manufactured by LycoRed Natural Products Industries Limited; containing 2% lycopene) was used as lycopene; San red 1F (manufactured by San-Ei Gen F.F.I., Inc.; containing 85% cochineal extract pigment) was used as a cochineal extract pigment; and San yellow 2SFU (manufactured by San-Ei Gen F.F.I., Inc.; containing 60% safflower pigment) was used as a safflower pigment.

Antioxidant:

Flavor holder RC (manufactured by T.HASEGAWA CO., LTD.; containing 30% polyphenol) was used as a green coffee bean extract; Tearfulane 90S (manufactured by ITO EN, LTD.; containing 92% total polyphenol, and among them, containing 63% catechin) or Polyphenol OPC Kyowa (manufactured by Kyowa Hakko Kogyo Co., Ltd.; containing 90% total polyphenol, and among them, containing equal to or more than 60% proanthocyanidine) was used as polyphenol; RM-21 (manufactured by Mitsubishi Chemical Corporation) was used as a rosemary extract; water-soluble vitamin E04 (manufactured by Kyowa Hakko Kogyo Co., Ltd.; containing 4% α-d-tocopherol) was used as tocopherol; sodium ascorbate (manufactured by Nippon Roche K.K.) was used as ascorbic acid; glycosyltransferase rutin (manufactured by San-EiGen F.F.I., Inc.; containing 15% rutin) was used as rutin; caffeine (manufactured by Junsei Chemical Co., LTD.) was used as caffeine; Fujiflavone P-10 (manufactured by Fujicco Co., Ltd.; containing 10% isoflavone) was used as isoflavone.

A transparent glass bottle was filled with 20 ml of the aqueous solution containing the vitamin $K_2$, the pigment and the antioxidant, and light of 2000 lux was irradiated thereto using a cool white fluorescent lamp (15 watt, manufactured by Hitachi, Ltd.) for 72 hrs.

After 72 hrs, 10 ml of cyclohexane was added to 5 ml of the aqueous solution containing the vitamin $K_2$, the pigment and the antioxidant, and 20 ml of ethanol in four divided aliquots was added there to followed by mixing with stirring. The mixture was centrifuged at 3000 rpm for 5 minutes, to separate the supernatant. To the remaining fraction was added 5 ml of cyclohexane followed by mixing with stirring and thereafter, the mixture was centrifuged at 3000 rpm for 5 min to separate the supernatant.

The supernatant fractions obtained by additionally repeating the similar operations twice were collected, and thereto was added cyclohexane to give the volume of 20 ml followed by filtration. Accordingly, the filtrate was obtained as a sample solution.

The sample solution was subjected to high performance liquid chromatography (HPLC) under the following conditions to measure the content of vitamin $K_2$, which was regarded as the concentration of vitamin $K_2$ after irradiation of the light.

HPLC analysis conditions
Column for separation: L-column ODS (4.6×150 mm) manufactured by Chemicals Inspection & Testing Institute, Japan
Catalyst column: platinum column IRICA RC·10-1 (4×10 mm) manufactured by Irika Kiki Corp.
Column temperature: 40° C.
Mobile phase: Methanol
Flow rate: 0.8 ml/min
Detection: Fluorescent detector (Ex. 320 nm, Em. 430 nm)
Volume of injection: 10 µl, Standard solution: 50 mg/l Residual ratio of vitamin $K_2$ was determined according to the following formula.

Residual ratio of vitamin $K_2$ (%) =
(concentration of vitamin $K_2$ after irradiation of light) / [concentration of vitamin $K_2$ before irradiation of light (4 mg/l)] × 100

In Tables 1 to 9, content of the pigment and the antioxidant in the solution, and the residual ratio of vitamin $K_2$ are shown. In the Tables, content of the pigment and the antioxidant is presented as the weight in 100 ml of the solution.

TABLE 1

| Pigment | Pigment content (mg) | Rutin content (mg) | | |
|---|---|---|---|---|
| | | 0 | 15 | 75 |
| Riboflavin | 0 | 0.0 | 0.0 | 0.0 |
| | 5 | 0.0 | 23.8 | 37.7 |
| Cochineal extract pigment | 0 | 0.0 | 0.0 | 0.0 |
| | 153 | 24.0 | 40.7 | 49.6 |
| β-Carotene | 0 | 0.0 | 0.0 | 0.0 |
| | 0.4 | 0.0 | 31.9 | 46.0 |
| Safflower pigment | 0 | 0.0 | 0.0 | 0.0 |
| | 60 | 16.2 | 26.1 | 61.3 |
| Gardenia pigment | 0 | 0.0 | 0.0 | 0.0 |
| | 32 | 0.0 | 33.2 | 45.7 |
| Marigold pigment | 0 | 0.0 | 0.0 | 0.0 |
| | 1.5 | 0.0 | 24.6 | 45.5 |
| Lycopene | 0 | 0.0 | 0.0 | 0.0 |
| | 1.5 | 0.0 | 21.8 | 36.5 |

TABLE 2

| Pigment | Pigment content (mg) | Green coffee bean extract content (mg) | | |
|---|---|---|---|---|
| | | 0 | 30 | 150 |
| Riboflavin | 0 | 0.0 | 0.0 | 0.0 |
| | 5 | 0.0 | 32.8 | 35.2 |
| β-Carotene | 0 | 0.0 | 0.0 | 0.0 |
| | 0.4 | 0.0 | 29.7 | 36.5 |
| Safflower pigment | 0 | 0.0 | 0.0 | 0.0 |
| | 60 | 16.2 | 29.1 | 35.6 |
| Gardenia pigment | 0 | 0.0 | 0.0 | 0.0 |
| | 32 | 0.0 | 29.9 | 43.5 |
| Marigold pigment | 0 | 0.0 | 0.0 | 0.0 |
| | 1.5 | 0.0 | 21.6 | 39.0 |
| Lycopene | 0 | 0.0 | 0.0 | 0.0 |
| | 1.5 | 0.0 | 18.3 | 25.9 |

TABLE 3

| Pigment | Pigment content (mg) | Tocopherol content (mg) | | |
|---|---|---|---|---|
| | | 0 | 20 | 100 |
| Riboflavin | 0 | 0.0 | 0.0 | 0.0 |
| | 5 | 0.0 | 15.2 | 21.3 |
| β-Carotene | 0 | 0.0 | 0.0 | 0.0 |
| | 0.4 | 0.0 | 18.3 | 41.4 |
| Safflower pigment | 0 | 0.0 | 0.0 | 0.0 |
| | 60 | 16.2 | 37.8 | 47.3 |
| Marigold pigment | 0 | 0.0 | 0.0 | 0.0 |
| | 1.5 | 0.0 | 0.0 | 18.0 |
| Lycopene | 0 | 0.0 | 0.0 | 0.0 |
| | 1.5 | 0.0 | 11.6 | 20.5 |

TABLE 4

| Pigment | Pigment content (mg) | Ascorbic acid content (mg) | | |
|---|---|---|---|---|
| | | 0 | 100 | 500 |
| Riboflavin | 0 | 0.0 | 0.0 | 0.0 |
| | 5 | 0.0 | 32.5 | 38.7 |
| Safflower pigment | 0 | 0.0 | 0.0 | 0.0 |
| | 60 | 16.2 | 19.4 | 18.9 |

TABLE 5

| Pigment | Pigment content (mg) | Isoflavone content (mg) | | |
|---|---|---|---|---|
| | | 0 | 6 | 30 |
| Riboflavin | 0 | 0.0 | 0.0 | 0.0 |
| | 5 | 0.0 | 16.8 | 37.6 |
| Safflower pigment | 0 | 0.0 | 0.0 | 0.0 |
| | 60 | 16.2 | 22.8 | 27.1 |

TABLE 6

| Pigment | Pigment content (mg) | Rosemary extract [added RM-21](mg) | | |
|---|---|---|---|---|
| | | 0 | 100 | 500 |
| Riboflavin | 0 | 0.0 | 0.0 | 0.0 |
| | 5 | 0.0 | 16.4 | 25.9 |

TABLE 6-continued

| Pigment | Pigment content (mg) | Rosemary extract [added RM-21](mg) | | |
|---|---|---|---|---|
| | | 0 | 100 | 500 |
| Safflower pigment | 0 | 0.0 | 0.0 | 0.0 |
| | 60 | 16.2 | 22.3 | 24.4 |

TABLE 7

| Pigment | Pigment content (mg) | Polyphenol content (in Polyphenol OPC Kyowa) (mg) | | |
|---|---|---|---|---|
| | | 0 | 18 | 90 |
| Riboflavin | 0 | 0.0 | 0.0 | 0.0 |
| | 5 | 0.0 | 38.8 | 44.2 |
| Safflower pigment | 0 | 0.0 | 0.0 | — |
| | 60 | 16.2 | 26.5 | — |

"—" indicates that no datum was obtained.

TABLE 8

| Pigment | Pigment content (mg) | Polyphenol content (in Tearfulane 90S) (mg) | | |
|---|---|---|---|---|
| | | 0 | 18 | 90 |
| Riboflavin | 0 | 0.0 | 0.0 | 0.0 |
| | 5 | 0.0 | 31.1 | 31.9 |

TABLE 9

| Pigment | Pigment content (mg) | Caffeine content (mg) | |
|---|---|---|---|
| | | 0 | 50 |
| Riboflavin | 0 | 0 | 0 |
| | 5 | 0 | 15.5 |

Example 2

Coenzyme Q10 (water-soluble CoQ10, manufactured by AQUANOVA; containing 3% ubidecarenone) in an amount of 40 mg was dissolved in 300 mL of water to produce an aqueous solution containing ubidecarenone at a concentration of 4 mg/L.

To the aqueous solution were added the pigment and the antioxidant shown in Tables 10 to 12 to prepare an aqueous solution containing ubidecarenone, the pigment and/or antioxidant. Light was irradiated in the similar manner as in Example 1, and thus the residual ratio of ubidecarenone 72 hours after irradiating the light was determined.

In Tables 10 to 12, content of the pigment and the antioxidant in the solution, and the residual ratio of vitamin $K_2$ are shown. The agent or preparation containing the pigment or the antioxidant employed was similar to that of Example 1.

In the Tables, content of the pigment and the antioxidant is presented as the weight in 100 ml of the solution.

TABLE 10

| Pigment | Pigment content (mg) | Rutin content (mg) | |
|---|---|---|---|
| | | 0 | 15 |
| Safflower pigment | 0 | 27.66 | 51.3 |
| | 60 | 72.5 | 80.9 |

TABLE 11

| Pigment | Pigment content (mg) | Polyphenol content (in Tearfulane 90S Kyowa) (mg) | |
|---|---|---|---|
| | | 0 | 18 |
| Riboflavin | 0 | 27.7 | 22.8 |
| | 5 | 26.7 | 41.3 |

TABLE 12

| Pigment | Pigment content (mg) | Polyphenol content (in Polyphenol OPC Kyowa) (mg) | |
|---|---|---|---|
| | | 0 | 18 |
| Riboflavin | 0 | 27.7 | 43.0 |
| | 5 | 26.7 | 47.6 |

Example 3

To the aqueous solution of vitamin $K_2$ obtained in Example 1 were added Cloudy base (manufactured by Ogawa & Co., Ltd.) as an emulsion, and Fujiflavone P-10 (manufactured by Fujicco Co., Ltd.; containing 10% isoflavone) or Tearfulane 90S (manufactured by ITO EN, LTD.; containing 92% total polyphenol, and among them, containing 63% catechin) as an antioxidant, respectively. Light resistance test of vitamin $K_2$ was performed in the similar manner as in Example 1 except that time period of the light irradiation was 16 hours.

In Table 13, content of the emulsion and the antioxidant in the aqueous solution, and the residual ratio of vitamin $K_2$ are shown. In the Tables, content of the emulsion and the antioxidant is presented as the weight in 100 ml of the solution.

TABLE 13

| Content | | Emulsion content (g) | |
|---|---|---|---|
| | (mg) | 0 | 6 |
| Isoflavone | 0 | 0 | 0 |
| | 110 | 13.6 | 19.4 |
| Polyphenol | 0 | 0 | 0 |
| | 9.2 | 13.1 | 21.4 |

Example 4

To 30 mg of vitamin $K_2$ emulsified powder (manufactured by Kyowa Hakko Kogyo Co., Ltd.), 20 mg of water-soluble biocarotene 02 (manufactured by Kyowa Hakko Kogyo Co., Ltd.; containing 2% β-carotene), 100 mg of Sanmerine (manufactured by San-Ei Gen F.F.I., Inc.; containing 15% rutin), 1.0 mg of vitamin $B_1$ (manufactured by Nippon Roche K.K.; thiamine hydrochloride), 1 mg of vitamin $B_{12}$ (manufactured by Nippon Roche K.K.; containing 0.1% cyanocobalamin), 8.45 mg of niacin (manufactured by Nippon Roche K.K.; nicotinamide), 5 mg of calcium pantothenate (manufactured by Kawai Pharmaceutical Co., Ltd.), 9 mg of vitamin C (manufactured by Nippon Roche K.K.; sodium ascorbate), 5 g of concentrated apple juice (manufactured by Sanyo Foods), 15 g of glucose syrup (manufactured by Sanmatsu Kogyo Co., LTD.), and 0.4 ml of apple flavor (manufactured by Ogawa & Co., Ltd.) is added 60 ml of water followed by mixing.

Thereto are added anhydrous citric acid and malic acid to adjust the pH to 2.85. Further, thereto is added an appropriate amount of water to give 100 ml in total volume. In a glass bottle, the mixture is sterilized by heating at 90° C. for 3 minutes to give a multivitamin beverage containing 60 pg of vitamin $K_2$ in 100 ml.

Example 5

To 4 mg of dry vitamin A (manufactured by Sankyo Co., Ltd.), 5.0 mg of riboflavin 5'-phosphate ester sodium salt (manufactured by Nippon Roche K.K.), 100 mg of Flavor holder RC (manufactured by T.HASEGAWA CO., LTD.; containing 30% polyphenol), 1.0 mg of vitamin $B_1$ (manufactured by Nippon Roche K.K.; thiamine hydrochloride), 1 mg of vitamin $B_{12}$ (manufactured by Nippon Roche K.K.; containing 0.1% cyanocobalamin), 8.45 mg of niacin (manufactured by Nippon Roche K.K.; nicotinamide), 5 mg of calcium pantothenate (manufactured by Kawai Pharmaceutical Co., Ltd.), 9 mg of vitamin C (manufactured by Nippon Roche K.K.; sodium ascorbate), 5 g of concentrated apple juice (manufactured by Sanyo Foods), 15 g of glucose syrup (manufactured by Sanmatsu Kogyo Co., LTD.), and 0.4 ml of apple flavor (manufactured by Ogawa & Co., Ltd.) is added 60 ml of water followed by mixing.

Thereto are added anhydrous citric acid and malic acid to adjust the pH to 2.85. Further, thereto is added an appropriate amount of water to prepare 100 ml in total volume. In a glass bottle, the mixture is sterilized by heating at 90° C. for 3 minutes to give a multivitamin beverage containing 210 μg of vitamin A in 100 ml.

Example 6

To 0.5 mg of dry vitamin $D_3$ (manufactured by Sankyo Co., Ltd.), 100 mg of San yellow 2SFU (manufactured by San-Ei Gen F.F.I., Inc.; containing 60% safflower pigment), 20 mg of Polyphenol OPC Kyowa (manufactured by Kyowa Hakko Kogyo Co., Ltd.; containing 90% total polyphenol, and among them, containing equal to or more than 60% proanthocyanidine), 1.0 mg of vitamin $B_1$ (manufactured by Nippon Roche K.K.; thiamine hydrochloride), 1 mg of vitamin $B_{12}$ (manufactured by Nippon Roche K.K.; containing 0.1% cyanocobalamin), 8.45 mg of niacin (manufactured by Nippon Roche K.K.; nicotinamide), 5 mg of calcium pantothenate (manufactured by Kawai Pharmaceutical Co., Ltd.), 9 mg of vitamin C (manufactured by Nippon Roche K.K.; sodium ascorbate), 5 g of concentrated apple juice (manufactured by Sanyo Foods), 15 g of glucose syrup (manufactured by Sanmatsu Kogyo Co., LTD.), and 0.4 ml of apple flavor (manufactured by Ogawa & Co., Ltd.) is added 60 ml of water followed by mixing.

Thereto are added anhydrous citric acid and malic acid to adjust the pH to 2.85. Further, thereto is added an appropriate amount of water to prepare 100 ml in total volume. In a glass bottle, the mixture is sterilized by heating at 90° C. for 3 minutes to give a multivitamin beverage containing 2.5 μg of vitamin $D_3$ in 100 ml.

Example 7

To 333 mg of coenzyme Q10 (manufactured by AQUANOVA; containing 3% water-soluble ubidecarenone), 5.0 mg of riboflavin 5'-phosphate ester sodium (manufactured by Nippon Roche K.K.), 20 mg of Tearfulane 90S (manufactured by ITO EN, LTD.; containing 92% total polyphenol, and among them, containing 63% catechin), 1.0 mg of vitamin $B_1$ (manufactured by Nippon Roche K.K.; thiamine hydrochloride), 1 mg of vitamin $B_{12}$ (manufactured by Nippon Roche K.K.; containing 0.1% cyanocobalamin), 8.45 mg of niacin (manufactured by Nippon Roche K.K.; nicotinamide), 5 mg of calcium pantothenate (manufactured by Kawai Pharmaceutical Co., Ltd.), 9 mg of vitamin C (manufactured by Nippon Roche K.K.; sodium ascorbate), 5 g of concentrated apple juice (manufactured by Sanyo Foods), 15 g of glucose syrup (manufactured by Sanmatsu Kogyo Co., LTD.), and 0.4 ml of apple flavor (manufactured by Ogawa & Co., Ltd.) is added 60 ml of water followed by mixing.

Thereto are added anhydrous citric acid and malic acid to adjust the pH to 2.85. Further, thereto is added an appropriate amount of water to prepare 100 ml in total volume. In a glass bottle, the mixture is sterilized by heating at 90° C. for 3 minutes to give a multivitamin beverage containing 10 mg of ubidecarenone in 100 ml.

Examples 8 to 31

The pigment or the emulsion and the antioxidant shown in Table 14 are added to 1000 ml of water in an amount as shown in Table 14 to prepare a stabilizer for a liquid food or drink containing a lipid-soluble vitamin. The agent or preparation containing the pigment or the antioxidant employed is similar to that of Example 1.

TABLE 14

|  | Pigment or emulsion | Added amount (mg) | Antioxidant | Added amount (mg) |
| --- | --- | --- | --- | --- |
| Example 8 | Riboflavin | 50 | Green coffee bean extract | 1000 |
| Example 9 | Riboflavin | 50 | Tocopherol | 1000 |
| Example 10 | Riboflavin | 50 | Ascorbic acid | 1000 |
| Example 11 | Riboflavin | 50 | Isoflavone | 600 |
| Example 12 | Riboflavin | 50 | Rosemary extract | 1000 |
| Example 13 | Riboflavin | 50 | Catechin | 200 |
| Example 14 | Riboflavin | 50 | Polyphenol | 200 |
| Example 15 | Cochineal extract pigment | 1800 | Rutin | 1000 |

TABLE 14-continued

| | Pigment or emulsion | Added amount (mg) | Antioxidant | Added amount (mg) |
|---|---|---|---|---|
| Example 16 | β-carotene | 223 | Rutin | 1000 |
| Example 17 | β-carotene | 223 | Green coffee bean extract | 1000 |
| Example 18 | β-carotene | 223 | Tocopherol | 1000 |
| Example 19 | Safflower pigment | 1000 | Rutin | 1000 |
| Example 20 | Safflower pigment | 1000 | Green coffee bean extract | 1000 |
| Example 21 | *Gardenia* pigment | 810 | Rutin | 1000 |
| Example 22 | *Gardenia* pigment | 810 | Green coffee bean extract | 1000 |
| Example 23 | Lutein | 760 | Rutin | 1000 |
| Example 24 | Lutein | 760 | Green coffee bean extract | 1000 |
| Example 25 | Lutein | 760 | Tocopherol | 1000 |
| Example 26 | Lutein | 760 | Ascorbic acid | 1000 |
| Example 27 | Lycopene | 740 | Rutin | 1000 |
| Example 28 | Lycopene | 740 | Green coffee bean extract | 1000 |
| Example 29 | Lycopene | 740 | Tocopherol | 1000 |
| Example 30 | Lycopene | 740 | Ascorbic acid | 1000 |
| Example 31 | Cloudy base | 60000 | Polyphenol | 200 |

INDUSTRIAL APPLICABILITY

According to the present invention, a liquid food or drink containing a lipid-soluble vitamin, a method of stabilizing a lipid-soluble vitamin, and a composition used in the method for the stabilization can be provided.

The invention claimed is:

1. A method of stabilizing vitamin K or ubiquinone to be contained in a solution or a liquid food or drink, which comprises adding an emulsion, and an antioxidant to a solution or a liquid food or drink containing vitamin K or ubiquinone, wherein the emulsion is an emulsion selected from the group consisting of cow milk, goat milk, ewe milk, horse milk, skimmed milk, partially skimmed milk, fermented milk, lactic acid bacterial beverage, milk beverage, concentrated milk, skimmed and concentrated milk, or an emulsion obtained by mixing an aqueous medium, a fat and oil and an emulsifier.

2. The stabilizing method according to claim 1, wherein the antioxidant is an antioxidant selected from the group consisting of polyphenol, tocopherol or a derivative thereof or a salt of the same, ascorbic acid or a salt thereof, rutin, caffeine and isoflavone.

3. The stabilizing method according to claim 1, wherein the vitamin K is phylloquinone (vitamin $K_1$), menaquinone (vitamin $K_2$) or menadione (vitamin $K_3$).

4. The stabilizing method according to claim 1, wherein the ubiquinone is ubidecarenone.

5. The stabilizing method according to claim 1, wherein the emulsion is added to give the content of the emulsion per 100 ml of the solution or the liquid food or drink containing the vitamin K or ubiquinone to be equal to or more than 1 g.

6. The stabilizing method according to claim 1, wherein the antioxidant is added to give the content of the antioxidant per 100 ml of the solution or the liquid food or drink containing the vitamin K or ubiquinone to be equal to or more than 0.1 mg.

* * * * *